United States Patent [19]

Ono et al.

[11] Patent Number: 5,240,779
[45] Date of Patent: Aug. 31, 1993

[54] POLYESTER FILM FOR FABRICATION

[75] Inventors: Tadashi Ono, Yokohama; Kinji Hasegawa, Hachioji; Takeo Asai; Yoji Murakami, both of Sagamihara, all of Japan

[73] Assignee: Teijin Limited, Osaka, Japan

[21] Appl. No.: 880,980

[22] Filed: Apr. 27, 1992

Related U.S. Application Data

[60] Division of Ser. No. 575,652, Aug. 30, 1990, abandoned, which is a continuation of Ser. No. 874,208, Apr. 27, 1992.

[30] Foreign Application Priority Data

Aug. 30, 1989 [JP] Japan .................................. 1-221579
Sep. 15, 1989 [JP] Japan .................................. 1-248863

[51] Int. Cl.$^5$ ...................... B29D 22/00; B32B 15/08; C08J 3/00; C08K 3/26
[52] U.S. Cl. .................................. 428/458; 428/35.8; 428/480; 524/425; 524/493; 524/497; 524/604; 524/605
[58] Field of Search ............ 428/626, 458, 35.8, 428/480; 524/425, 493, 497, 604, 605

[56] References Cited

U.S. PATENT DOCUMENTS 4,115,617  9/1978  Mitsuishi et al. .................. 428/336
4,818,581  4/1989  Katoh et al. ....................... 428/143
5,059,460  10/1991 Heyes et al. ....................... 428/458

FOREIGN PATENT DOCUMENTS 0312303  4/1989  European Pat. Off. .

OTHER PUBLICATIONS

Database WPIL, accession No. 89-266608 [37], Derwent Publications Ltd, London, GB; & JP-A-1 192 546 (Nippon Steel) *Whole abstract*.
Database WPIL, accession No. 89-266607 [37], Derwent Publications Ltd, London, GB; & JP-A-1 192 545 (Nippon Steel) *Whole abstract*.

Primary Examiner—Paul R. Michl
Assistant Examiner—Patrick Niland
Attorney, Agent, or Firm—Wenderoth, Lind & Ponack

[57] ABSTRACT

A biaxially oriented polyester film comprising a copolyester which contains a lubricant having an average particle diameter of no greater than 2.5 μm and has a melting point of from 210° to 245° C., the film having a plane orientation coefficient of from 0.10 to 0.16, a thermal shrinkage at 150° C. of no higher than 10%, and a density of lower than 1.385 g/cm$^3$, and optionally a refractive index in a direction of thickness of from 1.495 to 1.530 as well as a film plane refractive index of from 1.61 to 1.66 in all directions.

1 Claim, No Drawings

POLYESTER FILM FOR FABRICATION

This application is a divisional application of Ser. No. 07/575,652 filed on Aug. 30, 1990 now abandoned, which is a continuation of Ser. No. 07/874,208 filed Apr. 27, 1992.

The present invention relates to a polyester film for fabrication. More particularly, the present invention relates to polyester film for fabrication which has excellent deep drawabilities, pin hole resistance, excellent folding properties and the like and is useful, singly or after being laminated to other material such as a metal plate, for fabricating vessels or cans.

It has been well known to manufacture vessels, cans and the like by deep draw forming such as vacuum forming, air-pressure forming or the like of a plastic film. Examples of the plastic film usually used include polyolefin films, polystyrene films, polyvinyl chloride films, and non-oriented polyethylene terephthalate films. However, the severest defect of polyolefin, polystyrene and polyvinyl chloride films is that they lack thermal resistance and most of them cannot be used at a temperature no lower than 100° C. On the other hand, non-oriented polyethylene terephthalate films are disadvantageous in that they undergo crystallization phenomenon at a temperature no lower than 100° C. and as a result lose transparency and become brittle. Furthermore, most of plastics materials that have hitherto been used have a poor gas barrier property.

Generally, metal cans are coated with appropriate coating material on their inner and outer surfaces in order to prevent corrosion. Recently, however, it has been proposed to coat metal cans with a thermoplastic resin film as means for preventing rusts without using organic solvents with view to simplifying process, increasing hygienic qualities, preventing environmental pollution, and the like. That is, a process has been tried in which after a thermoplastic resin film is laminated on a plate of a metal such as brick, tin-free steel or a aluminum and the resulting laminate is fabricated into a can by draw forming or the like.

It has been tried to use a polyolefin film and a polyamide film as the thermoplastic resin film as described above. However, it has been found that they fail to satisfy all of fabrication quality, thermal resistance and fragrance preserving property simultaneously.

On the other hand, polyethylene terephthalate (PET) films and believed to have balanced characteristics and various proposals on their application. For example, the following are proposed:

(A) Plate forming material (or material for fabricating cans) composed of a biaxially oriented PET film laminated on a metal plate through an adhesive layer of a low melting point polyester (Japanese Patent Publications (Kokai) Nos. Sho 56-10451 and Hei 1-192546, etc.);

(B) Plate forming material composed of a noncrystalline or very low crystalline, low melting point modified PET film laminated on a metal plate (Japanese Patent Publications (Kokai) Nos. Hei 1-192545 and Hei 2-57339, etc.);

(C) A biaxially oriented PET film which has a low degree of orientation and is heat set and which is used for producing laminates together with a metal plate (Japanese Patent Publication (Kokai) No. Sho 64-22530); and the like.

However, as a result of investigation by the present inventors, it revealed that none of the above materials exhibits sufficient characteristics but has the following problems:

Plate forming material (A) is excellent in thermal resistance and fragrance preserving property but has an insufficient fabrication quality because it includes a laminated, biaxially oriented PET film so that chalking (formation of minute cracks) and breakage of films occur in the case of can forming involving deformation to a great extent.

Plate forming material (B) has a good fabrication quality but a poor fragrance preserving property because it includes a laminated noncrystalline or low-crystalline modified PET film, and therefore the film tends to be embrittled upon post-treatments after the can forming such as printing and retort sterilization so that there is a possibility that the film would be degenerated to become one which could be easily cracked or split when given impact from outside the can.

Film (C) does not always have isotropic film plane and therefore fabrication quality of the film tends to be poor in a specific direction on the plane of the film when all direction deformation is carried out as in the case of can forming.

Accordingly, an object of the present invention is to provide a biaxially oriented polyester film for fabrication which can solve the above-described problems.

As a result of intensive investigation, it has now been found that the above-described object of the present invention can be achieved by the following.

That is, the present invention provides [I] a biaxially oriented polyester film comprising a copolyester which contains a lubricant having an average particle diameter of no greater than 2.5 μm and has a melting point of from 210° to 245° C., the film having a surface orientation coefficient of from 0.10 to 0.16, a thermal shrinkage at 150° C. of no higher than 10%, and a density of lower than 1.385 g/cm$^3$, and [II] a biaxially oriented polyester film comprising a copolyester which contains a lubricant having an average particle diameter of no greater than 2.5 μm and has a melting point of from 210° to 245° C., the film having a plane orientation coefficient of from 0.10 to 0.16, a thermal shrinkage at 150° C. of no higher than 10%, a density of lower than 1.385 g/cm$^3$, a refractive index in a direction of thickness of from 1.495 to 1.530, and a film plane refractive index of from 1.61 to 1.66 in all directions.

The latter biaxially oriented polyester film [II] is particularly useful for laminating to metal containers.

Typical example of the copolyester which can be used in the film of the present invention includes copolyethylene terephthalate. Comonomer component, or mixed component, in the copolyester may be either an acid component or an alcohol component. As for the acid component, there can be used, for example, aromatic dibasic acids such as isophthalic acid, phthalic acid, and naphthalenedicarboxylic acid; aliphatic dicarboxylic acids such as adipic acid, azelaic acid, sebacic acid, and decanedicarboxylic acid; alicyclic dicarboxylic acids such as cyclohexanedicarboxylic acid, etc.; and the like. As for the alcohol component, there can be used, for example, aliphatic diols such as butanediol, neopentyl glycol, and hexanediol; alicyclic diols such as cyclohexanediol, etc.; and the like. These compounds can be used singly or two or more of them can be used in combination.

The proportion of the copolymerized component may vary depending on the kinds of the comonomers but generally is in a range such that the resulting copolyester has a melting point in a range of from 210° to 245° C., preferably from 215° to 240° C., and more preferably form 220° to 235° C. If the melting point of the copolyester is below 210° C., the polymer has a poor thermal resistance and tends to generate crazing (cracks) at the time of fabrication such as can forming, for example, fabrication of cans and it is impossible to print on molded materials or objects. On the other hand, if the melting point exceeds 245° C., the crystallizability of the polymer becomes too high for the polymer to have a sufficient fabrication quality. Here, the melting point of the polyester is measured by a method in which fusion peak is determined at a temperature elevation rate of 10° C./minute using DSC-SSC/580 manufactured by Seiko Electron Co., Ltd.

The copolyester used in the present invention contains a lubricant (or ship agent) having an average particle diameter of no greater than 2.5 μm. The lubricant may be either inorganic or organic ones. However, inorganic lubricants are preferred. Examples of the inorganic lubricant include silica, alumina, titanium dioxide (titania), calcium carbonate, and barium sulfate. As for the organic lubricant, silicone particles can be used. No matter which lubricant is used specifically, it must have an average particle diameter of no greater than 2.5 μm. Average particle diameter of the lubricant exceeding 2.5 μm is undesirable because in this case large particles are contained in a small quantity and the large particles present in portions of the film which undergo deformation as a result of fabrication such as deep draw plate forming or the like could serve as stating points from which pin holes would grow and the film could be broken according to circumstances.

Particularly preferred lubricant is a spherical monodispersed lubricant which has an average particle diameter of no greater than 2.5 μm and at the same time has a particle diameter ratio, defined as a ratio of long diameter/short diameter, of from 1.0 to 1.2. Examples of such lubricant include regular sphere-shaped silica, titania, zirconia, and silicone particles.

The average particle diameter and particle diameter ratio of the spherical monodispersed lubricant are obtained by depositing a metal by vapor deposition on the surfaces of the particles of the lubricant, taking electron micrograph of the particles at a magnification of from ×10,000 to ×30,000 and measuring long diameters, short diameters and diameters of projected area circles of the images of the particles in the electron micrograph, and applying the values thus obtained to the following equation to calculate the both parameters.

$$\text{Average particle diameter} = \frac{\text{Sum of diameters of projected area circles of particles}}{\text{Number of particles measured}}$$

$$\text{Particle diameter ratio} = \frac{\text{Average long diameter of particles}}{\text{Average short diameter of particles}}$$

It is preferred that the spherical lubricant particles have a sharp particle diameter distribution and more preferably have a realtive standard deviation of no greater than 0.5, and particularly no greater than 0.3.

The relative standard deviation is expressed by the following equation.

$$\text{Relative standard deviation} = \frac{\sqrt{\frac{\sum_{i=1}^{n}((Di - \overline{D})^2)}{n}}}{\overline{D}}$$

where the symbols have the following meanings:
Di: diameter of projected area circle of each particle (μm)
$\overline{D}$: average of diameters of projected area circles $$\left(= \frac{\sum_{i=1}^{n} Di}{n}\right) (\mu m), \text{ and}$$

n: number of particles

The amount of the lubricant to be contained in the copolyester may preferably be determined depending on the reeling property films during their production. Generally, it is preferred to add a smaller amount of the lubricant when it has a greater particle diameter vice versa. For example, silica having an average particle diameter of 2.0 μm is added preferably in an amount of about 0.05% by weight, and titanium dioxide having an average particle diameter of 0.3 μm is used preferably in an amount of about 0.3% by weight. Also, it is possible to make the film opaque by controlling the amount of the lubricant on purpose. For example, addition of titanium dioxide gives rise to white films.

The copolyester used in the present invention may if desired contain in a dispersed state various other additives such as antioxidants, heat stabilizers, ultraviolet absorbents, plasticizers, pigments, antistatic agents and the like.

No limitation is posed on the process of producing the copolyester used in the film of the present invention but it can be produced by various processes. For example, it can be produced by a process in which terephthalic acid, ethylene glycol and a copolymerizable component are subjected to esterification reaction, followed by polycondensing the reaction product to give a copolyester, a process in which dimethyl terephthalate, ethylene glycol and a copolymerizable component are subjected to interesterification reaction, followed by polycondensing the reaction product to obtain a copolyester, etc., are preferred. Also, another process can be used in which after blending a polyester consisting of a copolymerizable component with a polyethylene terephthalate, the resulting blend is molten and copolymerized by partition reaction.

The polyester film of the present invention is produced by melting the above-described copolyester, extruding the molten polymer through a die to form it into a film, and then biaxially orienting or stretching the film and thermosetting it. The plane orientation coefficient of the film must be no smaller than 0.10 and no greater than 0.16, and preferably higher than 0.11 and no higher than 0.15. If the film has a plane orientation coefficient of below 0.10, there tend to arise problems such as the occurrence of cracks when deep draw forming is carried out at a high deep draw ratio. On the other hand, if the plane orientation coefficient exceeds 0.16, breakage could occur during deep draw forming, which makes it impossible to perform the very deep draw forming.

Here, the plane orientation coefficient referred to above is defined by the following equation:

$$f = [(n_x + n_y)/2] - n_z$$

where f is a plane orientation coefficient, and $n_x$, $n_y$ and $n_z$ are refractive indices along a transverse direction, longitudinal direction and thickness, respectively, of a film. The refractive indices are measured at 25° C. under monochromatic light, spectral line D of Na, using an Abbe refractometer with attaching a polarized analyzer to its ocular side and using methylene iodide as a mount solution.

The polyester film of the present invention must have a thermal shrinkage at 150° C. of no higher than 10%, preferably no higher than 7%, and more preferably no higher than 6%, and a density of lower than 1.385 g/cm³, and preferably from 1.380 to 1.384 g/cm³.

The thermal shrinkage is obtained by marking two gauge marks at a distance or gauge length (x) of about 10 cm on a sample film at room temperature, holding the sample film in a circulating hot air oven for 30 minutes and then cooling down to room temperature again, followed by measuring the distance (y) between the two gauge marks, and calculating the objective parameter from the results obtained according to the following equation:

$$\text{Thermal shrinkage} = \frac{x - y}{x} \times 100 \, (\%)$$

and the thermal shrinkage in a longitudinal direction of the film is used as a representative parameter.

If the thermal shrinkage at 150° C. of the polyester exceeds 10%, the film shrinks to a great extent upon printing deep draw formed film products so that the products are deformed, which is obviously undesirable. If the thermal shrinkage is no higher than 10%, preferably no higher than 7%, and more preferably no higher than 6%, good results can be obtained because no deformation at all or minimized deformation, if any, is observed in the shape of the formed products when they are printed.

On the other hand, the density of films is measured using a density gradient tube. The density of the film exceeding 1.385 g/cm³ is undesirable because the film has a poor deep drawabilities and is susceptible to cracks, tearing, or breakage.

When the biaxially oriented polyester film of the present invention is to be used as being laminated to a metal plate for manufacturing metal vessels or cans, it is preferred that the film have in addition to the above-described requirements, the following requriements (1) and (2):

(1) The refractive index of the film in a direction of the thickness thereof is no lower than 1.495 and no higher than 1.530, and preferably no lower than 1.500 and no higher than 1.530. If it is below 1.495, the film has a insufficient fabrication quality, and if it exceed 1.530, that is, if the film is extremely low oriented, the film has a nearly noncrystalline structure, resulting in that the film tends to have an insufficient thermal resistance.

(2) The refractive index on the plane of the film must be in a range of no lower than 1.61 and no higher than 1.66, and preferably no lower than 1.615 and no higher than 1.655, in all directions. This is because deformation must occur uniformly in all directions in processings such as deep draw forming and drawdie forming which are widely used in can forming or in the manufacture of cans, and because any portions of the film must be able to follow this deformation. If the film plane refractive index is below 1.61 in a direction, the film has good fabrication quality but has a poor thermal resistance in this direction while in a direction in which the film plane refractive index exceeds 1.66, chalking and breakage occur in the film when it is deep draw formed because it has a poor fabrication in that direction.

These refractive indices are measured at 25° C. under monochromatic light, spectral line D of Na, using an Abbe refractometer with attaching a polarized analyzer to its ocular side and using methylene iodide as a mount solution in the same manner as described above.

In order to obtain the above-described refractive index in a direction of thickness and refractive index distribution in a direction of plane of the film, heat orientation in successive fabrication or conversion may preferably be performed under conditions of a longitudinal draw ratio of from 2.5 to 4.0, preferably from 2.5 to 3.6 a transverse draw ratio of from 2.7 to 4.0, preferably from 2.7 to 3.6 and a heat setting temperature of from 150° to 230° C. More preferably, the biaxially orientation and heat setting may be carried out with selecting, in addition to the above-described conditions, those conditions such that the film has a plane orientation coefficient of from 0.10 to 0.16, a thermal shrinkage at 150° C. of no higher than 10%, and a density of lower than 1.385 g/cm³, and further those conditions such that the film has a refractive index in a thickness direction of no lower than 1.495 and no higher than 1.530 and a film plane refractive index distribution of from 1.61 to 1.66 in all directions.

The polyester of the present invention has a thickness of preferably from 6 to 250 μm more preferably, 25 to 175 in the case of forming vessels or cans singly with film. In the case where it is applied to vessels or cans by deep draw forming, it has a thickness of from 10 to 75 μm, and preferably from 15 to 50 μm. If the thickness of the film is smaller than 10 μm, tears tend to occur in the film at the time of the processing. On the other hand, the thickness of the film exceeding 50 μm amounts to be over-improvement in the quality, which is not only unnecessary but also uneconomical.

Examples of suitable metal plate to which the polyester film of the present invention can be applied to include plates of brick, tin-free steel, aluminum and the like are used appropriately.

Hereafter, the present invention will be described in greater detail with reference to the following non-limitative Examples.

As will be obvious from the following examples, the polyester film of the present invention has excellent deep drawabilities, pin hole resistance, excellent folding properties and the like and is useful, singly or after being laminated to another material such as a metal plate or a plastics plate, for deep draw forming of vessels cans, and the like. Particularly, the polyester film [II] which is designed for use in the manufacture of metal vessels (cans), when it is deep draw formed after being affixed to a metal plate to form a metal vessel, exhibits excellent deep draw drawabilities and can give rise to metal vessels having excellent impact strength and thermal resistance.

In this case, as the method for laminating a metal plate with polyester film, following two methods of (1) and (2) may be, for example, applied.

(1) A thin layer of polyester film adjacent to a metal plate is intimately bonded by heating the metal plate to lower than the melting point of polyester film, laminating the metal plate with the polyester film and thereafter rapid cooling the polyester-laminated metal without crystallizing that thin layer portion film.

(2) An adhesive layer is coated as a primer on a polyester film, and then the surface thereof is laminated with a metal plate. As the adhesive layer, well-known resin adhesives such as epoxy type, epoxy-phenol type, epoxy-ester type alkyd type adhesives can be used according the objects thereof.

EXAMPLE 1 AND COMPARATIVE EXAMPLES 1 AND 2

Copolyethylene terephthalate comprising 12% by mole of isophthalic acid (melting point: 229° C., intrinsic viscosity: 0.60) containing 0.07% by weight of silica having an average particle diameter of 2.0 μm was melt-extruded at 270° C. and cooled rapidly to solidify, thus giving rise to non-oriented films. The non-oriented films thus obtained were subjected to longitudinal stretching, transverse stretching and then heat setting under the conditions shown in Table 1 to obtain biaxially oriented films having a thickness of 125 μm.

The characteristics of the films obtained are shown in Table 4.

TABLE 1

|  | Longitudinal stretching temperature (°C.) | Longitudinal stretching ratio | Transverse stretching temperature (°C.) | Transverse stretching ratio | Heat Setting Temperature (°C.) |
| --- | --- | --- | --- | --- | --- |
| Example 1 | 90 | 3.0 | 110 | 3.2 | 190 |
| Comparative Example 1 | 90 | 3.6 | 110 | 3.7 | 150 |
| Comparative Example 2 | 90 | 3.6 | 110 | 3.7 | 205 |

EXAMPLE 2 AND COMPARATIVE EXAMPLES 3 TO 6

Copolyethylene terephthalate comprising copolymerized components shown in Table 2 (intrinsic viscosity: 0.60) containing 0.05% by weight of silica having an average paticle diameter of 2.3 μm was melt-extruded at various temperatures shown in Table 2 and coled rapidly to solidify, thus giving rise to non-oriented films. The non-oriented films thus obtained were subjected to longitudinal stretching, transvrse stretching and then heat setting under the conditions shown in Table 2 to obtain biaxially oriented films having a thickness of 125 μm.

The characteristics of the films obtained are shown in Table 4.

TABLE 2

|  | Copolymerized component comonomer (mol %) | Melt Extrusion Temperature (°C.) | Conditions of Longitudinal Stretching Temperature (°C.) | Conditions of Longitudinal Stretching Ratio | Conditions of Transverse Stretching Temperature (°C.) | Conditions of Transverse Stretching Ratio | Heat Fixing Temperature (°C.) |
| --- | --- | --- | --- | --- | --- | --- | --- |
| Example 2 | Sebacic acid 9 | 270 | 90 | 3.2 | 110 | 3.3 | 200 |
| Comparative Example 3 | none | 290 | 90 | 2.5 | 125 | 2.8 | 235 |
| Comparative Example 4 | none | 290 | 95 | 2.1 | 125 | 2.2 | 235 |
| Comparative Example 5 | Isophthalic acid 4.5 | 285 | 95 | 2.3 | 125 | 2.4 | 220 |
| Comparative Example 6 | Isophthalic acid 22 | 230 | 90 | 3.5 | 60 | 3.6 | 160 |

EXAMPLES 3 AND 4

Copolyethylene terephthalate comprising 12% by mole of isophthalic acid (intrinsic viscosity: 0.60) containing a lubricant shown in Table 3 was melt-extruded at 270° C. and cooled rapidly to solidify, thus giving rise to non-oriented films. The non-oriented films thus obtained were subjected to longitudinal stretching at a temperature of 80° C. at a ratio of 3.3 times the original, transverse stretching at a temperature f 110° C. at a ratio of 3.5 times the original, and then heat setting at a temperature of 200° C.

The resulting biaxially oriented films (thickness: 25 μm) had characteristics shown in Table 4.

TABLE 3

|  | Lubricant | Average Particle Diameter (μm) | Amount (%) |
| --- | --- | --- | --- |
| Example 3 | Tianium Dioxide | 0.3 | 0.2 |
| Example 4 | Titanium Dioxide | 0.3 | 0.5 |

Ten films obtained in Examples 1 to 4 and Comparative Examples 1 to 6, respectively, each having a width of 600 mm were heated for 10 seconds using an IR heater to raise the temperature of the films to 90° C., and then the films were placed on a metal mold having an inlet diameter of 70 mm, a bottom diameter of 55 mm and a depth of 120 mm and pressure air formed at a pressure of 5 kg/cm². Then, brims of the resulting cup-like products were cut off and brim portions were curled to form cups.

These cups were evaluated on their deep drawabilities and printing properties (dimension stability upon printing). The results were considered in combination to make general evaluation. Table 4 shows results of general evaluation. Smbols ○ and × in Table 4 have the following meanings.

Deep Draw Forming Properties
○: No crack nor breakage ocurred in the film.
×: Cracks or breakage occurred in the film.
Printing Properties
○: No strain occured in the cup.
×: Strain occurred in the cup.

General Evaluation
○: Acceptable
×: Unacceptable deviation: 0.1) was melt-extruded at various temperatures shown in Table 5 and cooled rapidly to solidify, thus giving rise to non-oriented films. The non-oriented films thus obtained were subjected to longitudinal stretching, transverse stretching and then heat setting under the conditions shown in Table 5 to obtain biaxially oriented films having a thickness of 125 μm.

The characteristics of the resulting films are shown in Table 7.

TABLE 5

| | Comonomer | | Melt Extrusion Temperature (°C.) | Conditions of Longitudinal Stretching | | Conditions of Transverse Stretching | | Heat Setting Temperature (°C.) |
|---|---|---|---|---|---|---|---|---|
| | Component | Composition (mol %) | | Temperature (°C.) | Ratio | Temperature (°C.) | Ratio | |
| Example 5 | Isophthalic acid | 9 | 280 | 90 | 3.0 | 115 | 3.1 | 200 |
| Example 6 | Isophthalic acid | 12 | 270 | 90 | 3.0 | 110 | 3.2 | 200 |
| Example 7 | Isophthalic acid | 12 | 270 | 90 | 3.0 | 110 | 3.2 | 190 |
| Example 8 | Isophthalic acid | 12 | 270 | 90 | 3.0 | 110 | 3.2 | 180 |
| Example 9 | Isophthalic acid | 18 | 250 | 90 | 3.2 | 110 | 3.4 | 180 |
| Example 10 | Sebacic acid | 9 | 280 | 90 | 3.2 | 110 | 3.1 | 210 |
| Example 11 | Sebacic acid | 12 | 270 | 90 | 3.2 | 110 | 3.2 | 200 |
| Comparative Example 7 | None | — | 290 | 90 | 2.5 | 125 | 2.8 | 235 |
| Comparative Example 8 | Isophthalic acid | 4.5 | 285 | 95 | 2.3 | 125 | 2.4 | 220 |
| Comparative Example 9 | Isophthalic acid | 12 | 270 | 90 | 3.6 | 110 | 3.7 | 150 |
| Comparative Example 10 | Isophthalic acid | 22 | 230 | 90 | 3.5 | 90 | 3.6 | 160 |

COMPARATIVE EXAMPLES 11 AND 12

Copolyethylene terephthalate comprising copoly-

TABLE 4

| | Melting point (°C.) | Longitudinal Thermal Shrinkage (%) | Density (g/cm³) | Plane Orientation Coefficient | Deep Drawabilities (Cracks) | Deep Drawabilities (Breakage) | Printing Properties (Strain of Shape) | General Evaluation |
|---|---|---|---|---|---|---|---|---|
| Example 1 | 229 | 3.5 | 1.382 | 0.140 | ○ | ○ | ○ | ○ |
| Example 2 | 243 | 2.2 | 1.380 | 0.105 | ○ | ○ | ○ | ○ |
| Example 3 | 229 | 1.7 | 1.384 | 0.108 | ○ | ○ | ○ | ○ |
| Example 4 | 229 | 1.8 | 1.382 | 0.108 | ○ | ○ | ○ | ○ |
| Comparative Example 1 | 229 | 11.0 | 1.375 | 0.162 | ○ | × | × | × |
| Comparative Example 2 | 229 | 0.7 | 1.375 | 0.095 | × | ○ | ○ | × |
| Comparative Example 3 | 225 | 1.5 | 1.405 | 0.136 | × | × | ○ | × |
| Comparative Example 4 | 225 | 1.0 | 1.402 | 0.115 | × | × | ○ | × |
| Comparative Example 5 | 247 | 2.0 | 1.387 | 0.115 | × | × | ○ | × |
| Comparative Example 6 | 208 | 3/5 | 1.352 | 0.070 | × | ○ | ○ | × |

The results shown in Table 4 revealed that the films obtained in Examples 1 to 4 were excellent in deep drawabilities and printing properties.

EXAMPLES 5 TO 11 AND COMPARATIVE EXAMPLES 7 TO 10

Copolyethylene terephthalate comprising copolymerized components shown in Table 5 (intrinsic viscosity: 0.60) containing 0.05% by weight of monodispersed spherical silca having an average particle diameter of 2.0 μm (particle diameter ratio: 1.07, relative standard merized components shown in Table 6 (intrinsic viscosity: 0.60) containing 0.10% by weight of bulk silica having an average particle diameter of 2.3 μm (particle diameter rato: 2.1, relative standard deviation: 7) was melt-extruded at various temperatures shown in Table 6 and cooled rapidly to solidify, thus giving rise to non-oriented films. The non-oriented films thus obtained were subjected to longitudinal stretching, transverse stretching and then heat setting under the conditions shown in Table 6 to obtain biaxially oriented films having a thickness of 125 μm.

The characteristics of the resulting films are shown in Table 7.

Printing Properties
○: No strain occurred in the cup.
×: Strain occurred in the cup.
General Evaluation

TABLE 6

|  | Comonomer | | Melt Extrusion Temperature (°C.) | Conditions of Longitudinal Stretching | | Conditions of Transverse Stretching | | Heat Setting Temperature (°C.) |
|---|---|---|---|---|---|---|---|---|
|  | Component | Composition (mol %) |  | Temperature (°C.) | Ratio | Temperature (°C.) | Ratio |  |
| Comparative Example 11 | Isophthalic acid | 12 | 270 | 90 | 3.0 | 110 | 3.2 | 190 |
| Comparative Example 12 | Sebacic acid | 12 | 270 | 90 | 3.0 | 110 | 3.2 | 200 |

Thirteen films obtained in Examples 5 to 11 and Comparative Examples 7 to 12, respectively, each having a width of 600 mm were heated for 10 seconds using an IR heater to raise the temperature of the films to 90° C., and then the films were placed on a metal mold having an inlet diameter of 70 mm, a bottom diameter of 55 mm and a depth of 120 mm and pressure air formed at a pressure of 5 kg/cm². Then, brims of the resulting cup-like products were cut off and brim portions were curled to form cups.

These cups were evaluated on their deep drawabilities and printing properties (dimension stability upon printing). The results were considered in combination to make general evaluation. Table 7 shows results of general evaluation. Symbols ○ and × in Table 4 have the following meanings.

Deep Drawabilities
○: No crack, breakage or pin hole occurred in the film.
×: Cracks, breakage or pin holes occurred in the film.

○: Acceptable
×: Unacceptable

The results shown in Table 7 revealed that the films obtained in Examples 5 to 11 were excellent in deep drawabilities and printing properties.

TABLE 7

|  | Lubricant | Plane Orientation Coefficient (—) | Longitudinal Thermal Shrinkage (%) | Density (g/cm³) | Deep Drawabilities | | | Printing Properties (Strain of Shape) | General Evaluation |
|---|---|---|---|---|---|---|---|---|---|
|  |  |  |  |  | (Cracks) | (Breakage) | (Pin Hole) |  |  |
| Example 5 | A | 0.132 | 2.2 | 1.3849 | ○ | ○ | ○ | ○ | ○ |
| Example 6 | A | 0.115 | 2.1 | 1.3848 | ○ | ○ | ○ | ○ | ○ |
| Example 7 | A | 0.127 | 2.8 | 1.3846 | ○ | ○ | ○ | ○ | ○ |
| Example 8 | A | 0.132 | 3.5 | 1.3847 | ○ | ○ | ○ | ○ | ○ |
| Example 9 | A | 0.107 | 3.9 | 1.3811 | ○ | ○ | ○ | ○ | ○ |
| Example 10 | A | 0.105 | 2.2 | 1.3701 | ○ | ○ | ○ | ○ | ○ |
| Example 11 | A | 0.128 | 3.0 | 1.3715 | ○ | ○ | ○ | ○ | ○ |
| Comparative Example 7 | A | 0.136 | 1.5 | 1.4058 | × | × | ○ | ○ | × |
| Comparative Example 8 | A | 0.115 | 2.0 | 1.3873 | × | × | ○ | ○ | × |
| Comparative Example 9 | A | 0.162 | 11.0 | 1.3755 | ○ | × | ○ | × | × |
| Comparative Example 10 | A | 0.070 | 3.5 | 1.3820 | × | ○ | ○ | ○ | × |
| Comparative Example 11 | B | 0.140 | 3.5 | 1.3820 | ○ | ○ | × | ○ | × |
| Comparative Example 12 | B | 0.127 | 2.9 | 1.3715 | ○ | ○ | × | ○ | × |

Note:
Lubricant A indicates monodispersed spherical silica having an average particle diameter of 2.0 m.
Lubricant B indicates polydispersed bulk silica having an average particle diameter of 2.3 m.

EXAMPLES 12 TO 15 AND COMPARATIVE EXAMPLES 13 TO 15

Copolyethylene terephthalate compising copolymerized components shown in Table 8 (intrinsic viscosity: 0.60) containing monodispersed spherical silica having an average particle diameter of 1.5 μm or 2.3 μm (particle diameter ratio: 1.07, relative standard deviation: 0.1) was melt-extruded at various temperatures shown in Table 8 and cooled rapidly solidify, thus giving rise to non-oriented films. The non-oriented films thus obtained were subjected to longitudinal stretching, transverse stretching and then heat setting under the conditions shown in Table 8 to obtain biaxially oriented films having a thickness of from 25 to 30 μm.

The characteristics of the resulting films are shown in Table 11.

TABLE 8

| | Comonomer Component Composition | Lubricant Amount | Melt Extrusion Temperature (°C.) | Conditions of Longitudinal Stretching Temperature (°C.) | Ratio | Conditions of Transverse Stretching Temperature (°C.) | Ratio | Heat Fixing Temperature (°C.) |
|---|---|---|---|---|---|---|---|---|
| Example 12 | Isophthalic acid 12 mol % | 1.5 m Silica 0.1% (wt) | 280 | 100 | 3.0 | 110 | 3.1 | 190 |
| Example 13 | Sebacic acid 12 mol % | 1.5 m Silica 0.1% (wt) | 280 | 90 | 3.0 | 100 | 3.1 | 200 |
| Example 14 | Isophthalic acid 9 mol % | 2.0 m Silica 0.05% (wt) | 290 | 105 | 3.1 | 115 | 3.2 | 210 |
| Example 15 | Sebacic acid 9 mol % | 2.0 m Silica 0.05% (wt) | 290 | 95 | 3.1 | 105 | 3.2 | 210 |
| Comparative Example 13 | None | 2.0 m Silica 0.05% (wt) | 290 | 105 | 2.5 | 115 | 2.8 | 235 |
| Comparative Example 14 | Isophthalic acid 5 mol % | 2.0 m Silica 0.05% (wt) | 290 | 105 | 2.8 | 115 | 2.9 | 220 |
| Comparative Example 15 | Isophthalic acid 22 mol % | 2.0 m Silica 0.05% (wt) | 260 | 95 | 3.3 | 105 | 3.4 | 170 |

EXAMPLE 16 AND COMPARATIVE EXAMPLES 16

Copolyethylene terephthalate comprising 12% by mole of isophthalic acid (intrinsic viscosity: 0.60) containing a lubricant shown in Table 9 was melt-extruded at 280° C. and cooled rapidly to solidify, thus giving rise to non-oriented films. The non-oriented films thus obtained were subjected to longitudinal stretching at a temperature of 100° C. at a ratio of 3.0 times the original, transverse stretching at a temperature of 110° C. at a ratio of 3.1 times the original, and then heat setting at a temperature shown in Table 9.

The resulting biaxially oriented films had characteristics shown in Table 11.

TABLE 9

| | Lubricant | Average Particle Diameter (μm) | Amount (%) | Heat Fixing Temperature (°C.) |
|---|---|---|---|---|
| Example 16 | Titanium Dioxide | 0.3 | 0.3 | 170 |
| Comparative Example 16 | Bulk Silica | 2.7 | 0.05 | 190 |

COMPARATIVE EXAMPLES 17 TO 20

Copolyethylene terephthalate comprising 12% by mole of isophthalic acid (melting point: 229° C., intrinsic viscosity: 0.60) containing 0.05% by weight of monodispersed spherical silica having an average particle diameter of 2.0 μm was melt-extruded at 280° C. and cooled rapidly to solidify, thus giving rise to non-oriented films. The non-oriented films thus obtained were subjected to longitudinal stretching, transverse stretching and then heat setting under the conditions shown in Table 10 to obtain biaxially oriented films.

The characteristics shown in Table 11.

TABLE 10

| | Conditions of Longitudinal Stretching Temperature (°C.) | Ratio | Conditions of Transverse Stretching Temperature (°C.) | Ratio | Heat Setting Temperature (°C.) |
|---|---|---|---|---|---|
| Comparative Example 17 | 100 | 3.0 | 110 | 3.1 | 210 |
| Comparative Example 18 | 100 | 3.6 | 110 | 3.7 | 180 |
| Comparative Example 19 | 100 | 2.5 | 110 | 3.5 | 180 |
| Comparative Example 20 | 100 | 3.0 | 110 | 3.8 | 180 |

Thirteen films obtained in Examples 12 to 16 and Comparative Examples 13 to 20, respectively, were each laminated on both surfaces of a tin-free steel plate of a thickness of 0.25 mm heated at temperature of 260° C., and then the films were cut into discs of 150 mm in diameter. The discs thus obtained were deep draw formed in two steps using a draw die and a punch to produce cylindrical vessels of 55 mm in diameter having no seam on the respective side walls thereof.

These vessels were evaluated on their deep drawabilities, resistance to impact fractures and resistance to thermal embrittlement. The results were considered in combination to make general evaluation. Table 11 shows results of general evaluation. Symbols ○, Δ and × in Table 11 have the following meanings.

DEEP DRAWABILITIES-1

○: No abnormality in the film was observed on both the inner and outer surfaces of the vessels during the processing. Chalking and breakage was not deserved and Δ: Chalking was observed in the films on the inner and outer surfaces at the upper portion of the vessel or ×: Breakage was observed in a portion of the films on the inner and outer surfaces of the vessel.

DEEP DRAWABILITIES-2

○: No abnormality in the film was observed on both the inner and outer surfaces of the container during the processing, and rust prevention test conducted on the inner film surface of the vessel gave a value measured of no higher than 0.2 mA. The rust prevention test was carried out by charging an aqueous 1% NaCl solution in the vessel, introducing an electrode in the solution, establishing a voltage of 6 V using the vessel as a positive electrode and measuring a value of current. The test is abbreviated as ERV test higher than 0.2 mA.

×: No abnormality was observed in the film on both the inner and outer surfaces of the vessel, but the ERV test gave a current value of no lower than 0.2 mA. Upon observation on an enlarged scale of portions to which electricity was applied, cracks in a form of pin hole starting from bulky particle (for example, particle diameter is no less than 10 μm.) were found in a portion of the films on the inner and outer surfaces of vessel.

RESISTANCE TO IMPACT FRACTURE

Water was filled in a vessel having good deep drawability. For each test, ten such waterfilled vessels were fallen from a height of 1 m onto a polyvinyl chloride tile floor, and then The ERV test was conducted on the inside the container. Symbols ○, Δ and × in Table 11 have the following meanings.

○: All the ten vessels gave a current value of no higher than 0.2 mA.

Δ: One to fice vessels gave a current value of no lower than 0.2 mA.

×: Six or more vessels gave a current value of no lower than 0.2 mA, or showed cracks immediately after the falling.

RESISTANCE TO THERMAL EMBRITTLEMENT

Containers which exhibited good deep drawabilities were kept at 210° C. for 5 minutes, fllowed by evaluation of the above-described resistance to impact fracture. In this case, symbols ○, Δ and × in Table 11 have the following meanings.

○: All the ten vessels gave a current value of no higher than 0.2 mA.

Δ: One to five vessels gave a current value of no lower than 0.2 mA.

×: Six or more vessels gave a current value of no lower than 0.2 mA, or showed cracks immediately after the heating at 210° C. for 5 minutes.

General Evaluation
○: Acceptable
×: Unacceptable

The results described in Table 11 revealed that the films obtained in Examples 12 to 16 were excellent in all of the deep draw forming properties, resistance to impact fracture and thermal resistance.

TABLE 11

|  | Melting Point (°C.) | Lubricant Average Particle Diameter (m) | Thickness of film (m) | Longitudinal Thermal Shrinkage (%) | Plane Orientation Coefficient | Density (g/cm$^3$) | Thickness Direction Refractive Index | Film Plane Refractive (Max/Min) |
|---|---|---|---|---|---|---|---|---|
| Example 12 | 229 | 1.5 | 25 | 2.8 | 0.1079 | 1.3844 | 1.526 | 1.649/1.632 |
| Example 13 | 229 | 1.5 | 25 | 0.9 | 0.1151 | 1.3632 | 1.512 | 1.647/1.616 |
| Example 14 | 235 | 2.0 | 30 | 1.8 | 0.1152 | 1.3848 | 1.523 | 1.654/1.626 |
| Example 15 | 235 | 2.0 | 30 | 1.8 | 0.1169 | 1.3707 | 1.515 | 1.653/1.615 |
| Example 16 | 229 | 0.3 | 15 | 5.0 | 0.1287 | 1.3838 | 1.513 | 1.647/1.634 |
| Comparative Example 13 | 260 | 2.0 | 25 | 1.3 | 0.1358 | 1.3995 | 1.514 | 1.653/1.642 |
| Comparative Example 14 | 247 | 2.0 | 25 | 1.5 | 0.1345 | 1.3955 | 1.518 | 1.654/1.640 |
| Comparative Example 15 | 208 | 2.0 | 25 | 4.2 | 0.0691 | 1.3520 | 1.533 | 1.646/1.640 |
| Comparative Example 16 | 229 | 2.7 | 30 | 3.0 | 0.1070 | 1.3847 | 1.527 | 1.648/1.631 |
| Comparative Example 17 | 229 | 2.0 | 20 | 0.3 | 0.0721 | 1.3669 | 1.547 | 1.641/1.619 |
| Comparative Example 18 | 229 | 2.0 | 20 | 5.5 | 0.1431 | 1.3852 | 1.501 | 1.655/1.642 |
| Comparative Example 19 | 229 | 2.0 | 20 | 4.8 | 0.1254 | 1.3842 | 1.515 | 1.655/1.608 |
| Comparative Example 20 | 229 | 2.0 | 20 | 3.4 | 0.1301 | 1.3849 | 1.512 | 1.662/1.635 |

|  | Deep Drawabilities 1 | Deep Drawabilities 2 | Resistance to Impact Feature | Resistance to Thermal Embrittlement | General Evaluation |
|---|---|---|---|---|---|
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Comparative Example 13 | X | Not determined | Not determined | Not determined | X |
| Comparative Example 14 | Δ | Not determined | Not determined | Not determined | X |
| Comparative Example 15 | ○ | ○ | Δ | X | X |
| Comparative Example 16 | ○ | X | Not determined | Not determined | X |
| Comparative Example 17 | ○ | ○ | X | Not determined | X |
| Comparative | X | Not determined | Not determined | Not determined | X |

TABLE 11-continued

| | | | | | |
|---|---|---|---|---|---|
| Example 18 | | | | | |
| Comparative Example 19 | ◯ | ◯ | Δ | X | X |
| Comparative Example 20 | Δ | Not determined | Not determined | Not determined | X |

What is claimed is:

1. A biaxially oriented polyester film-laminated metal plate to be used for manufacturing a vessel or can, characterized in that said polyester film comprises a copolyethylene terephthalate which contains a lubricant having an average particle diameter of not greater than 2.5 μm and has melting point of from 210° to 245° C., and in that said polyester film has a plane orientation coefficient of from 0.10 to 0.16, a thermal shrinkage at 150° C. of not higher than 10%, a density of lower than 1.385 g/cm$^3$, a refractive index in a direction of thickness of from 1.495 to 1.530, and a film plane refractive index of from 1.61 to 1.66 in all direction.

* * * * *